June 21, 1966
F. J. LUKETA
3,256,578
COMPOSITE LINK COUPLERS FOR TRAWL NETS
Filed Sept. 16, 1963
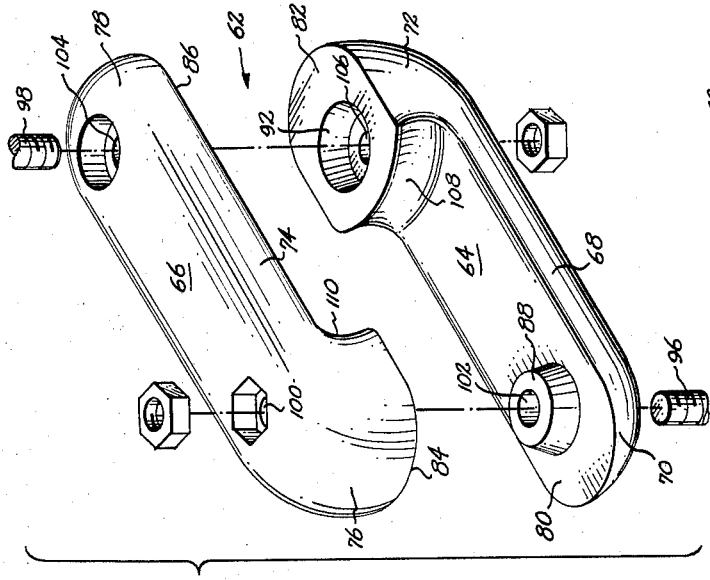
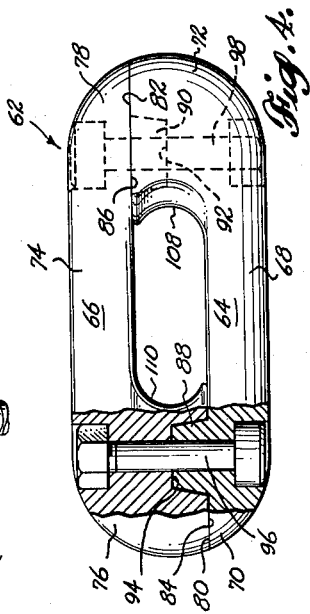
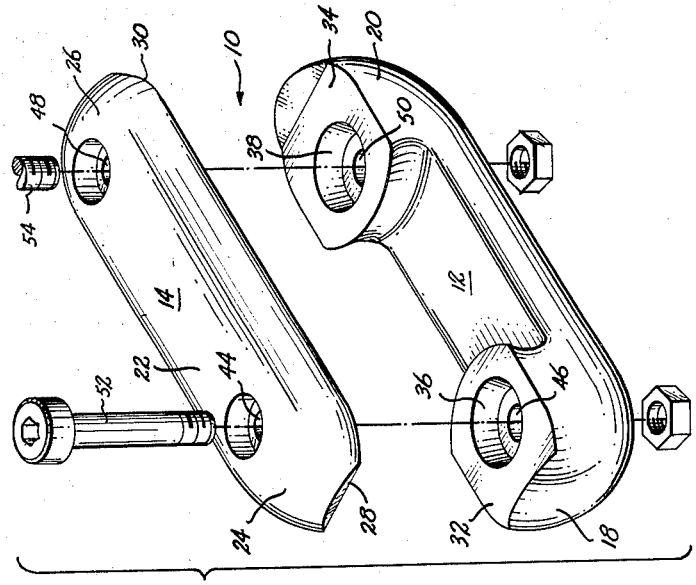
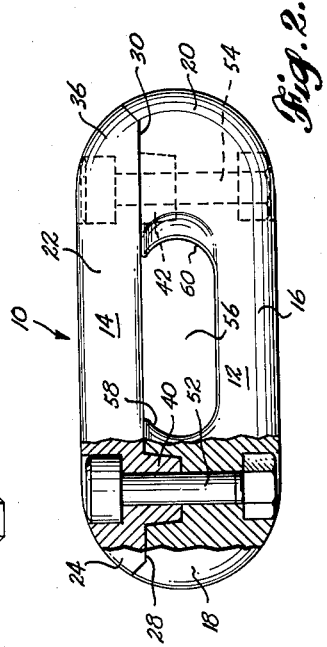
INVENTOR.
FRANK J. LUKETA
BY *Mattis & Graybeal*
ATTORNEYS United States Patent Office 3,256,578
Patented June 21, 1966

3,256,578
COMPOSITE LINK COUPLERS FOR TRAWL NETS
Frank J. Luketa, 5567 Greenwood Ave. N.,
Seattle, Wash.
Filed Sept. 16, 1963, Ser. No. 309,095
4 Claims. (Cl. 24—123)

The present invention relates to non-snagging, composite link couplers especially designed for use in installations wherein a net or like object of reticular (i.e. having veins or fibers crossing like a network of open mesh) construction is drawn over or otherwise put in relative moving contact with the couplers of the installation.

By way of typical and therefore non-limitive example, non-snagging, composite link couplers characteristic of the present invention have a special utility respecting trawl net suspension arrangements, wherein various suspension elements are coupled together and to a portion of the trawl net at a region surrounded on top and at the sides by additional portions of the said net, and wherein during use or during certain handling operations of the net, the said portions of the net make relative moving contact with the suspension elements and the couplers. Such an environmental arrangement for the subject coupler is disclosed in my copending U.S. application Serial No. 252,089, filed January 17, 1963, now Patent No. 3,162,967 and entitled, "Trawl Net Suspension."

Conventional shackle couplers, which are commonly used in commercial fishing net installations, have projecting parts and are smaller in size than the meshes of a trawl net. For this reason, conventional shackles cannot be satisfactorily employed in fishing net installations wherein moving contact sometimes occurs between the net and the couplers, such as in the aforementioned trawl net suspension arrangement, for example. This is because the meshes of the net snag on the said projecting parts of the conventional shackle, causing the net to foul and/or tear. If fouling of the net occurs during placement thereof in the water, the net will not assume its normal in use position in the water and/or will be ripped. The net must then be hauled back aboard the fishing vessel to be unsnagged and/or repaired and then reset in the water. The principal object of the present invention is to provide a coupler that is incapable of fouling or tearing the net, and thereby obviate additional handling or repairing of the net.

Characteristically, all forms of couplers according to the present invention are composited from a plurality of elements and in assembled form are interiorly open, perimetrically closed, and closely in appearance resemble a conventional chain link. Each form of such couplers comprises laterally spaced side portions, longitudinally spaced end portions extending partly outboard of and partly in between the adjacent ends of said side portions, a pair of pin elements disposed in aligned openings that extend generally axially through said end portions, generally parallel to each other, and at opposite locations outboard of the open interior, and means detachably securing said pin elements in said aligned openings, with each of said end portions including means forming at least one joint that extends generally transversely of its pin element.

Preferably the pin element is a socket-head bolt, with the socket head thereof being countersunk substantially flush with the perimetrical surface on one side of the coupler, and with such bolt being retained by a nut that is countersunk generally flush with the perimetrical surface on the opposite side of the coupler. When assembled, each form of coupler possesses "rounded" corners and presents "rounded" surfaces in substantially all directions with no projections or protrusions. According to the forms of the invention, the joints in the end portions are constructed to break the surface along generally straight lines and on rounded corner portions of the couplers, with the perimetrical surfaces on opposite sides of the joints substantially blending together at the surface breaks. By virtue of this arrangement, the rounded corners can function to cam the net strands to one side or the other of the surface breaks and in that manner prevent the netting from snagging on the coupler at such surface breaks. For the foregoing reasons, the couplers of the present invention are characteristically "non-snagging" and "non-chafing."

An additional object, feature and advantage of the present invention is the provision of a composite link-type coupler that is simple in construction, economical to manufacture, and yet is durable and capable of long periods of repetitious use.

Additional objects, features and advantages of the present invention include the provision of a composite link-type coupler that is constructed so as to neither snag nor chafe a trawl net when moving contact occurs between such coupler and the net, as for example, in the trawl net hauling method of my copending application entitled, Drum Trawling Method and Apparatus, Serial No. 269,691, filed April 1, 1963, now abandoned.

These and other characteristics and features, objects and advantages of the present invention will be apparent from the following description of certain typical embodiments thereof, taken together with the accompanying illustrations wherein like letter designations and like numerals refer to like parts, and wherein:

FIG. 1 is a perspective view of one form of coupler according to the present invention, such form comprising a pair of distinct elements, one such element being substantially [-shaped and other being substantially straight like a bar;

FIG. 2 presents a side elevational view of the coupler of FIG. 1, as it appears when assembled and with a part shown in section;

FIG. 3 is an exploded perspective view of a modified form of coupler, such form comprising a pair of identical, substantially L-shaped, complementary elements; and FIG. 4 is a side elevational view of the coupler of FIG. 3, as it appears when assembled and with a part shown in section.

In my copending application Serial No. 273,617, filed April 17, 1963, and entitled Non-Snagging Shackle Couplers for Trawl Nets, I have illustrated a trawl net layout (FIG. 1) and, on a larger scale, a fragmentary view (FIG. 2) of the lower bosom looking toward one end of a suspension bar.

In the latter view, a plurality of couplers are shown interconnecting a net suspender and a bobbin line to the suspension bar and one end of a sweepline to an end of a bobbin line. Also in such copending application, I have illustrated (FIGS. 3 and 4) and have described typical snagging conditions that are apt to occur when conventional shackle couplers are employed at these locations. Reference is now expressly made to the net layout (FIG. 1) and suspension assembly (FIG. 2) illustrations, the description of such illustration and the illustrations (FIGS. 3 and 4) and discussion pertaining to the use of conventional shackle couplers for interconnecting various suspension elements. Insofar as it may be desirable to a better understanding of the present invention, the disclosure of said copending application Serial No. 273,617, is hereby incorporated herein by reference.

Turning to a specific consideration of the coupler form shown at FIGS. 1 and 2, said coupler 10 is of two piece construction and consists of a generally [-shaped member 12 and a substantially straight bar-like member 14. The mid portion 16 of member 12, which is a side portion of the coupler 10, is preferably wider than it is deep. End portion forming parts 18, 20 are integrally formed with and situated outboard of the opposite ends of side portion 16. Member 14 also has a mid portion 22, forming the second side portion of coupler 10, and end portion forming parts 24, 26 formed integral with portion 22. Parts 24, 26 have inwardly facing joint surfaces 28, 30, and when coupler 10 is assembled (FIG. 2) they match the abuttingly relatable joint surfaces 32, 34 formed on the terminals of parts 18, 20. Joint surfaces 32, 34 are illustrated as including depressions 36, 38 of appropriate size to receive and snugly accommodate therein a pair of projections 40, 42, respectively, formed on joint surfaces 28, 30.

A pair of openings 44, 48, extend transversely through end parts 24, 26 of member 14 and are registerable with another pair of openings 46, 50 extending longitudinally through end parts 18, 20 of member 12, the openings 44, 46, 48, 50 are formed generally concentrically through depressions 36, 38 and projections 40, 42.

Nut and bolt assemblies 52, 54 insertable through registerable openings 44, 46 and 48, 50, respectively, serve to couple members 12, 14 together to form the coupler 10. The head and nut portions of said assemblies 52, 54 are countersunk substantially flush with the outboard surfaces of end parts 18, 20, 24, 26, so that such elements do not constitute protuberances on which the strands of the trawl net may snag.

As shown in FIG. 2, when assembled coupler 10 closely resembles a conventional chain length in appearance in that it possesses rounded corners, is of rounded cross-sectional configuration regardless of where the section is taken, and in general presents rounded surfaces in all directions.

The hollow interior 56 of coupler 10 is bounded at its ends by concave wear surfaces 58, 60, representing the surfaces contacted by the elements being coupled together, e.g., a first ring member attached to one end of a sweepline and a second ring member attached to the end of a bobbin line.

As illustrated, the greater portions of the matched pairs of joint surfaces 28, 32 and 30, 34 extend generally perpendicular to the centerline axis of nut-and-bolt assemblies 52, 54. And, such matched pairs of joint surfaces 28, 32 and 30, 34 break the surface of coupler 10 on rounded corners and can function to cam the net strands to one side or the other of said surface break and in that manner prevent the strands of netting from snagging on the coupler 10 at such surface breaks. In addition, if a strand should happen to align itself with a surface break and tend to snag therein, an amount of relative movement between the coupler 10 and the net would cause the longitudinally curved edge at such joint, against which the strand is being pulled, to cam the strand out of said surface break.

The coupler form shown by FIGS. 3 and 4 consists of a pair of complementary members 64, 66, of identical construction and of a substantially L-shape. When assembled, coupler 62 is substantially identical in appearance with coupler 10, described above. In the drawings, 68 designates the mid-portion of member 64, such midportion 64 constituting a side portion of the coupler 62. End portion forming parts 70, 72 are integrally formed with and are situated outboard of the opposite ends of side portion 68. In identical fashion, member 66 comprises a mid-portion 74, forming the second side portion of the coupler 62, and end portion forming parts 76, 78, formed integral with said side portion 74.

When coupler 62 is assembled (FIG. 4) joint surfaces 80, 82 formed on end parts 70, 72 abut matching joint surfaces 84, 86 formed on end parts 76, 78, respectively, and the surface breaks are on rounded corners. Such joint surfaces 80, 82, 84, 86 are provided with interfitting raised and recessed means, preferably in the form of frustral conical projections 88, 90, formed on the shallower end parts 70, 78, and corresponding frustral conical depressions 92, 94, formed in the deeper end parts 72, 76, respectively.

Nut and bolt assemblies 96, 98 removably securable within registrable pairs of openings 100, 102, and 104, 106, respectively, retain members 64, 66 together, with the head and nut portions of said assemblies 96, 98 being countersunk substantially flush with the surrounding surface portions of the coupler 62. In this form of the invention, one of the concave wear surfaces, designated 108, is formed on member 64 (on the inboard side of end part 72) and the other wear surface, designated 110, is formed on member 66 (on the inboard side of end part 76).

From the foregoing, further variations, adaptations, modifications and characteristic features can be evolved by those skilled in the art to which the invention is addressed, within the scope of the following claims.

What is claimed is:

1. A composite link coupler comprising complementary first and second generally L-shaped members each having a major arm and a minor arm, each major arm having an inboard surface abuttingly relatable to an end surface of the minor arm of the other generally L-shaped member, with registrable openings extending lengthwise through said minor arms and transversely through end parts of said major arms; pin elements insertable into said registrable openings; and means for removably securing said pin elements in said registrable openings.

2. A composite link coupler according to claim 1, said coupler further including interfitting raised and recessed means on the abuttingly relatable surfaces.

3. A composite link coupler according to claim 2, wherein the registrable openings extend through said interfitting raised and recessed means.

4. An internally open, perimetrically closed, link coupler comprising spaced, generally parallel, side portions; jointed end portions situated outboardly of the ends of said side portions and spanning the spaces between each pair of adjacent ends of said side portions; pin elements extending through openings in said end portions, said pin elements also extending generally parallel to each other, at locations outboardly of the opposite ends of the open interior of the coupler; and means releasably securing said pin elements in said openings, with said coupler presenting convex surfaces in substantially all directions outwardly, including around said jointed end portions, with the convex surface at each end of the coupler curving from the general vicinity of one end of the pin element at such end around to the general vicinity of the other end of the same pin element, with said end portions each comprising one major part and one minor part with said side portions each having a said major part formed integral with one of its ends, and the minor part of the other end portion formed integral with its other end, so as to form a pair of related, generally L-shaped elements, and with said pin elements detachably securing said generally L-shaped elements together.

References Cited by the Examiner

UNITED STATES PATENTS

| 1,601,893 | 10/1926 | Vigneron | 43—9 |
|---|---|---|---|
| 2,168,539 | 8/1939 | Reynolds | 59—87 |
| 2,421,186 | 5/1947 | Delano | 59—87 |
| 2,709,616 | 5/1955 | Larson et al. | |
| 3,018,580 | 1/1962 | Luketa | 43—9 |
| 3,023,529 | 3/1962 | Luketa | 43—9 |

FOREIGN PATENTS

| 197,289 | 11/1923 | Great Britain. |
|---|---|---|
| 52,826 | 6/1934 | Norway. |
| 81,033 | 11/1952 | Norway. |

SAMUEL KOREN, *Primary Examiner.*

FRANCIS R. CHAPPELL, *Examiner.*